(12) United States Patent
Shibata et al.

(10) Patent No.: US 8,092,096 B2
(45) Date of Patent: Jan. 10, 2012

(54) WHEEL BEARING APPARATUS FOR A VEHICLE

(75) Inventors: Kiyotake Shibata, Iwata (JP); Takayuki Norimatsu, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/818,568

(22) Filed: Jun. 18, 2010

(65) Prior Publication Data

US 2010/0316320 A1    Dec. 16, 2010

Related U.S. Application Data

(63) Continuation of application No. PCT/JP2008/003843, filed on Dec. 18, 2008.

(30) Foreign Application Priority Data

Dec. 20, 2007   (JP) ................................. 2007-328258

(51) Int. Cl.
*F16C 13/00* (2006.01)
(52) U.S. Cl. .......................... 384/544; 384/589; 384/625
(58) Field of Classification Search .................. 384/544, 384/589, 625
See application file for complete search history.

(56) References Cited

U.S. PATENT DOCUMENTS

| | | | | |
|---|---|---|---|---|
| 6,357,925 | B2* | 3/2002 | Tajima et al. | 384/544 |
| 6,488,789 | B2* | 12/2002 | Tajima et al. | 384/492 |
| 6,666,303 | B2* | 12/2003 | Torii et al. | 384/544 |
| 7,874,734 | B2* | 1/2011 | Komori et al. | 384/544 |
| 2007/0098315 | A1* | 5/2007 | Komori et al. | 384/544 |
| 2007/0149299 | A1* | 6/2007 | Azuma et al. | 464/179 |

FOREIGN PATENT DOCUMENTS

| | | |
|---|---|---|
| JP | 2000-110840 | 4/2000 |
| JP | 2006-188187 | 7/2006 |
| JP | 2007-147064 | 6/2007 |

* cited by examiner

*Primary Examiner* — James Pilkington
(74) *Attorney, Agent, or Firm* — Harness, Dickey & Pierce, P.L.C.

(57) ABSTRACT

A vehicle wheel bearing apparatus has an outer member, an inner member, and at least one inner ring press fit onto a cylindrical portion of a wheel hub. Double row rolling elements are rollably contained between double row outer raceway surfaces and double row inner raceway surfaces. A constant velocity universal joint torque is inserted into the wheel hub. It is axially separably connected to the wheel hub by a securing nut. A shoulder of an outer joint member of the constant velocity universal joint abuts against the inner member. An abutting surface of the inner member that abuts the shoulder of an outer joint member is formed so that it does not include a segment of a mirror finished surface with an area exceeding 0.005 mm$^2$.

9 Claims, 7 Drawing Sheets

[Fig 1]
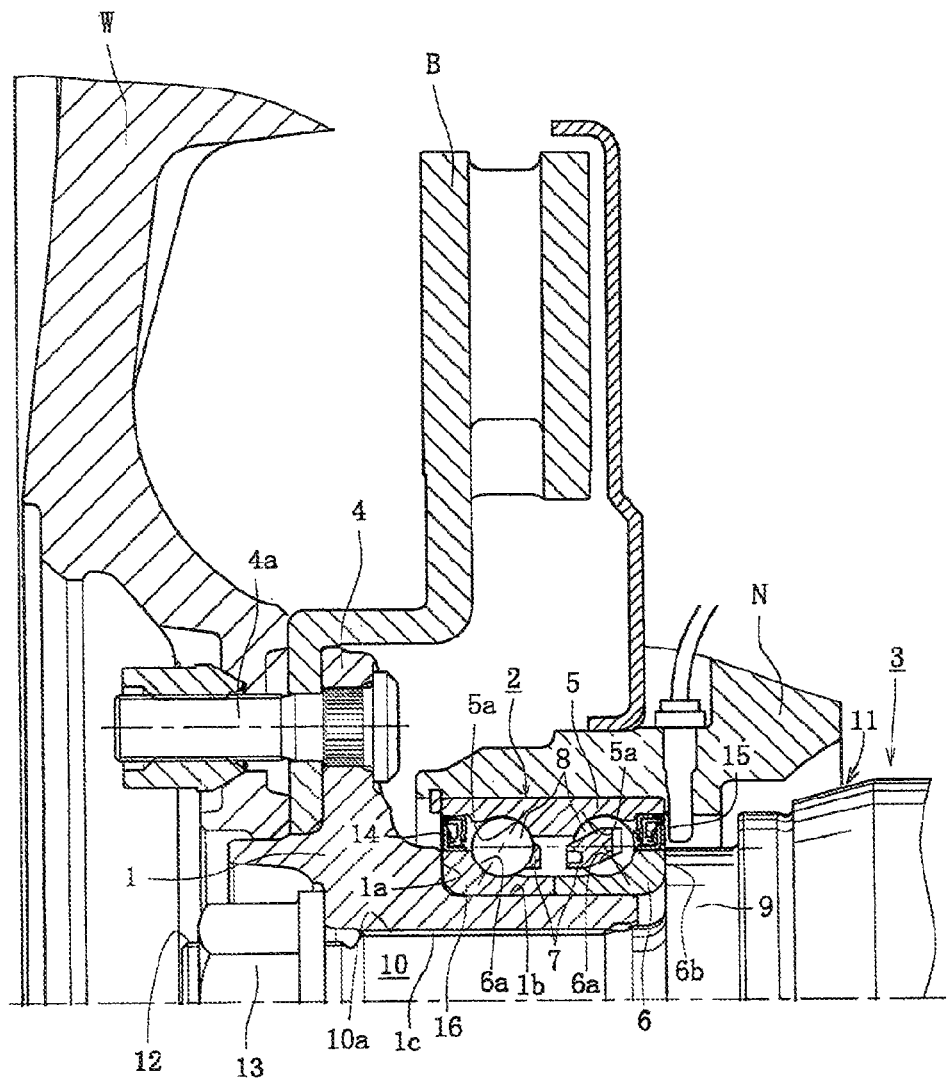

[Fig 2]
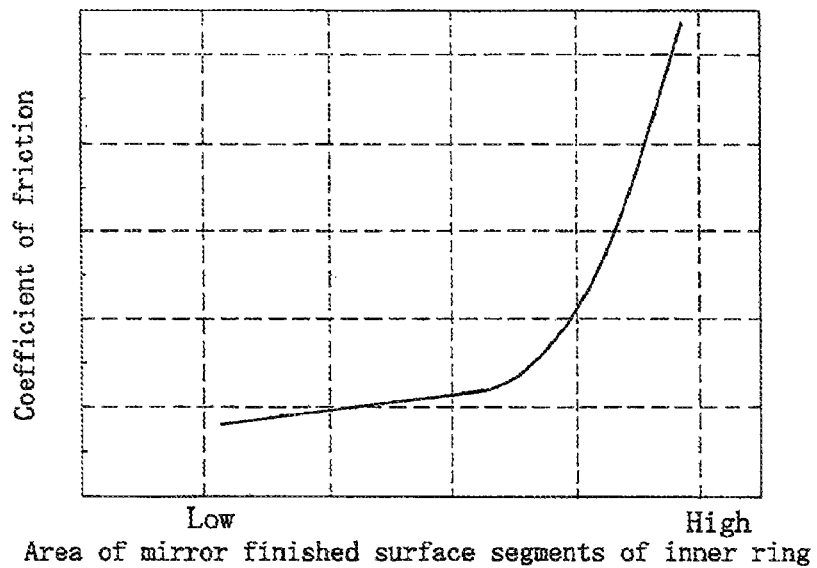
Area of mirror finished surface segments of inner ring
[Fig 3]
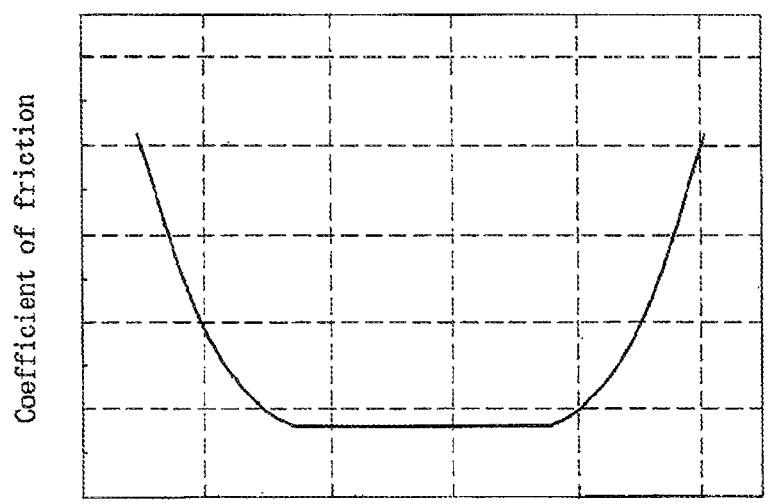
Surface roughness of larger end face of inner ring

[Fig 6]
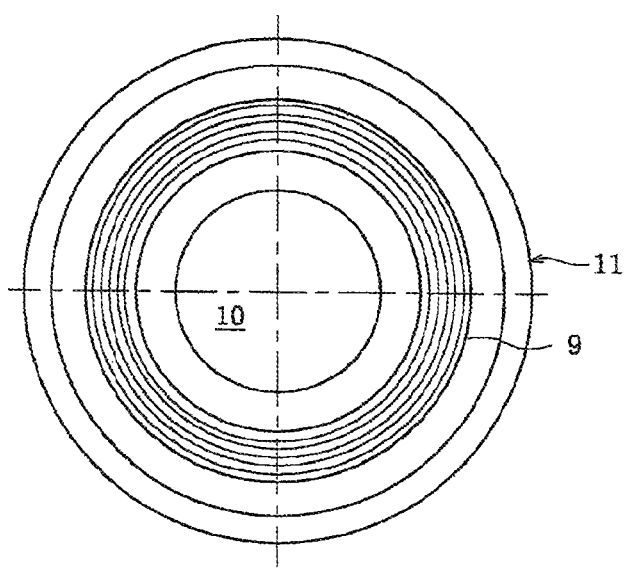

[Fig 7]
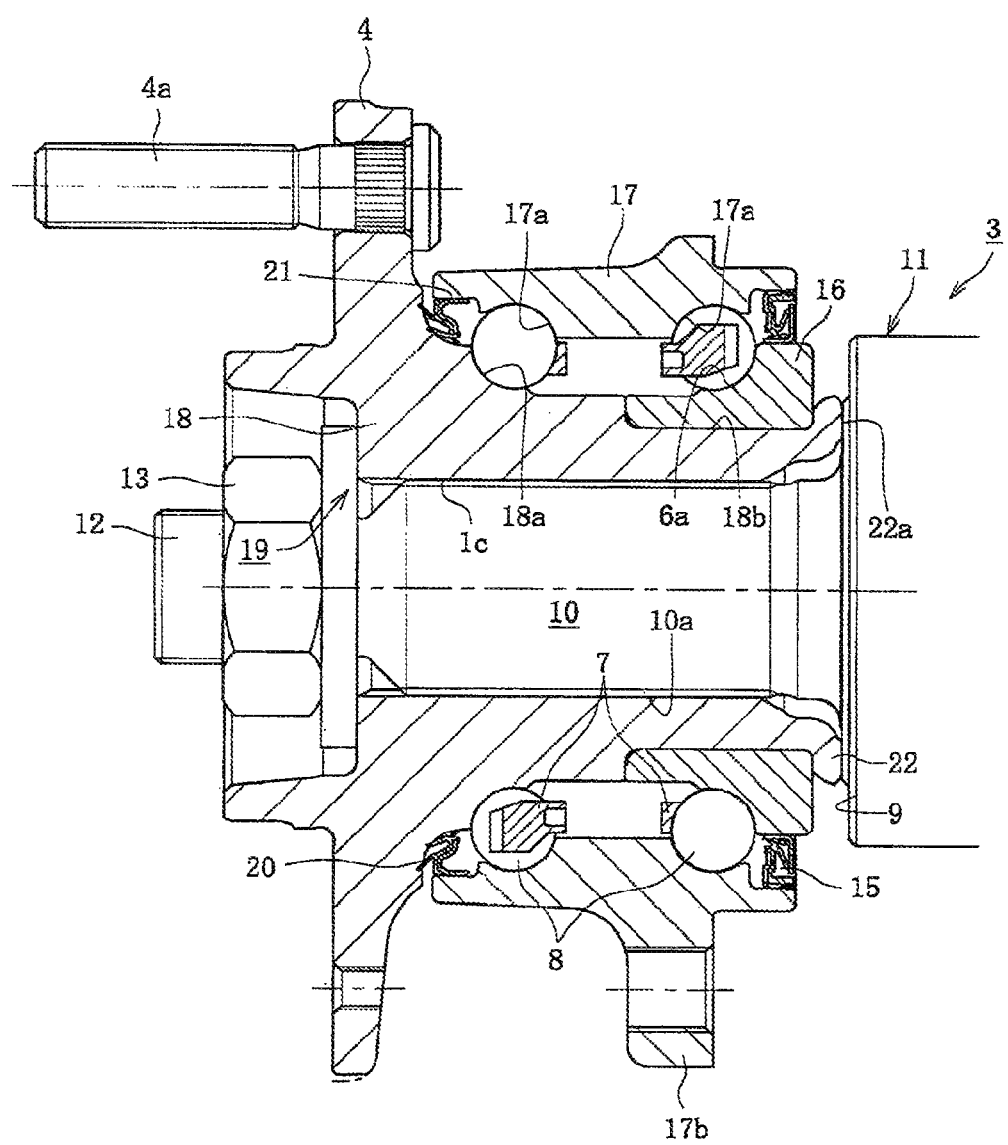

[ Fig 8 ]
PRIOR ART
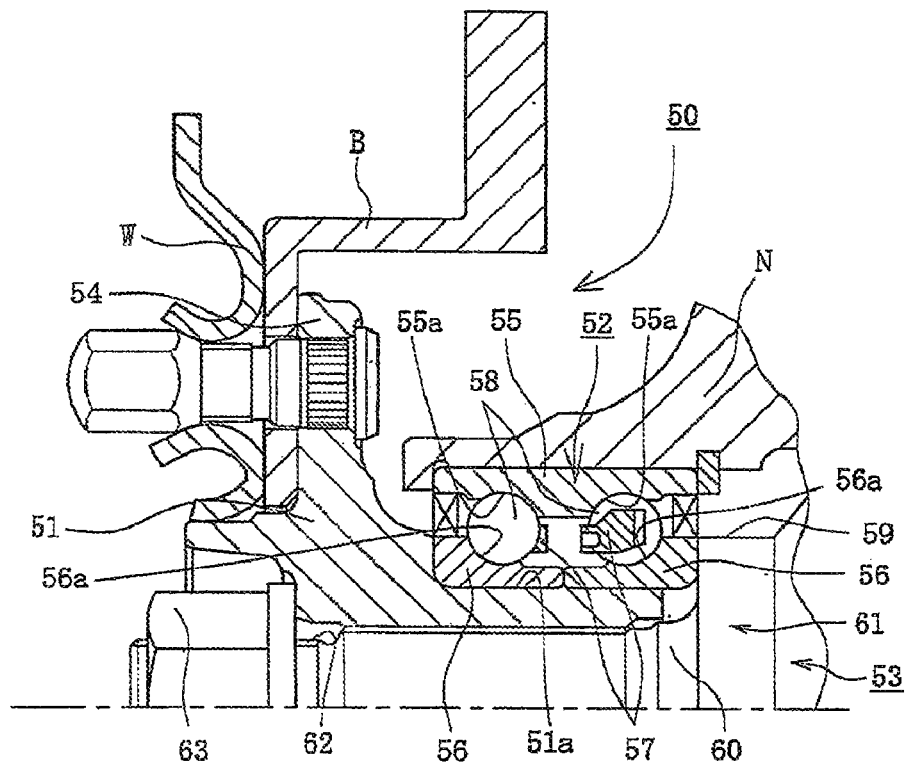
[ Fig 9 ]
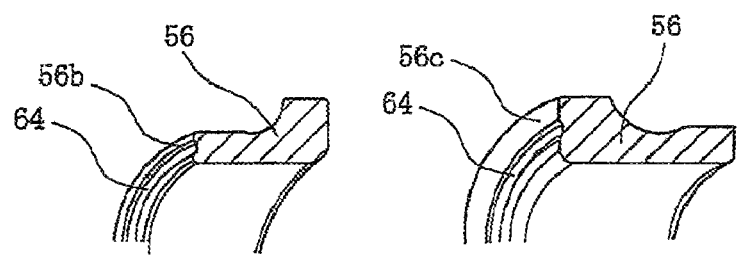
Fig 9(a)
PRIOR ART
Fig 9(b)
PRIOR ART

WHEEL BEARING APPARATUS FOR A VEHICLE

CROSS-REFERENCE TO RELATED APPLICATIONS

This application is a continuation of International Application No. PCT/JP2008/003843, filed Dec. 18, 2008, which claims priority to Japanese Application No. 2007-328258, filed Dec. 20, 2007. The disclosures of the above applications are incorporated herein by reference.

FIELD

The present disclosure relates to a vehicle wheel bearing apparatus to support driving wheels of a vehicle such as an automobile and, more particularly, to a wheel bearing apparatus to rotationally support driving wheels (front wheels of FF vehicle, rear wheels of FR or RR vehicle and whole wheels of 4 WD vehicle) mounted on an independent suspension relative to the suspension.

BACKGROUND

In a power transmitting apparatus transmitting engine power of a vehicle, such as an automobile, to its wheels, it is necessary not only to transmit the power from the engine to the wheels, but also to allow for radial and axial displacements. Moment displacement from the wheels is caused by bounds or turns of the vehicle during running on rough roads. One end of a drive shaft, arranged between an engine side and a driving wheel side, is connected to a differential gear unit via a constant velocity universal joint of the sliding type. The other end of the drive shaft is connected to a driving wheel via a wheel bearing apparatus including a constant velocity universal joint of a secured type.

Various types of wheel bearing apparatus have been previously proposed, for example, as shown in FIG. 8. The wheel bearing apparatus 50 includes a wheel hub 51 having a wheel W and a brake rotor B mounted to it. A double row rolling bearing 52 rotationally supports the wheel hub 51. A secured type constant velocity universal joint 53, for transmitting power from a drive driving shaft (not shown in figure), is connected with the wheel hub 51.

The wheel hub 51 is integrally formed with a wheel mounting flange 54 at one end. The wheel mounting flange 54 mounts the wheel W and the brake rotor B. A cylindrical portion 51a axially extends from the wheel mounting flange 54.

The double row rolling bearing 52 is formed with a double row angular contact ball bearing. An outer ring 55 is mounted between a knuckle N, forming part of the suspension apparatus and the cylindrical portion 51a of the wheel hub 51. The outer ring inner circumference includes double row outer raceway surfaces 55a, 55a. A pair of inner rings 56, 56 is arranged opposite to the double row outer raceway surfaces 55a, 55a. Each inner ring 56, 56 is formed on its outer circumferences with an inner raceway surface 56a, 56a. Double row balls 58, 58 are rollably contained, via cages, 57 between the inner and outer raceway surfaces 55a, 55a and 56a, 56a.

The constant velocity universal joint 53 has an outer joint member 61 with a cup shaped mouth portion (not shown). A shoulder 59 is formed at a bottom of the mouth portion. A shaft portion 60 axially extends from the shoulder 59. The outer joint member 61 is inserted into the wheel hub 51, via a serration, in a torque transmittable fashion. The shaft portion 60 is inserted into the wheel hub 51 until the shoulder 59 abuts against the inner ring 56 of the double row rolling bearing 52. A securing nut 63 is fastened onto an outer thread 62, formed on one end of the shaft portion 60, by a predetermined fastening torque to axially separably connect the wheel hub 51 and the outer joint member 61.

It is known that a large torque is transmitted to the wheel W via a sliding type constant velocity universal joint (not shown) from an engine during a low engine speed range, such as in starting of a vehicle. Thus, a torsional force is caused in the driving shaft. As a result, a torsional force is also caused in the inner ring 56 of the double row rolling bearing 52 that supports the driving shaft. When a large torsional force is caused in the drive shaft, a so-called "stick-slip noise" is generated due to a sudden slippage caused between abutting surfaces of the shoulder 59 of the outer joint member 61 and end face of the inner ring 56.

To cope with this problem in the prior art wheel bearing apparatus 50, a surface machining, to reduce a frictional resistance, is made on a part abutting against the shoulder 59 of the outer joint member 61. More particularly, as shown in FIGS. 9(a) and (b), grooves 64, for receiving grease, are circumferentially formed along the end faces 56b, 56c of the inner ring 56. These grooves 64 help the introduction of grease into an interface between mutually adjacent surfaces. Thus, this reduces the frictional resistance. Accordingly a smooth slippage can be caused therebetween and thus the generation of the stick-slip noise can be suppressed. See, Japanese Laid-open Patent Publication No. 110840/2000.

However these surface machinings made in plural parts increase the machining steps and complicate the process management. Thus, this prevents a reduction of the manufacturing cost.

Additionally, in the prior art wheel bearing apparatus, the securing nut 63 is fastened to the outer thread 62 of the shaft portion 60 of the outer joint member 61. A fastening force (axial force) exceeding a predetermined level is required to adjust and control an amount of pre-pressure of the double row rolling bearing 52. Although it is possible to reduce the frictional resistance at first by grease applied between the abutting interfaces, a risk arises in that the applied grease would be forced out by the fastening force. Thus, it is difficult to keep the friction reducing effect for a long term.

SUMMARY

It is, therefore, an object of the present disclosure to provide a vehicle wheel bearing apparatus that achieves a smooth slippage between mutually abutting members and thus prevents the generation of stick-slip noise.

To achieve the object of the present disclosure, a vehicle wheel bearing apparatus is provided that comprises an outer member integrally formed with double row outer raceway surfaces on its inner circumference. An inner member includes a wheel hub integrally formed with a wheel mounting flange on one end. Its other end includes an axially extending cylindrical portion. At least one inner ring is press fit onto the cylindrical portion of the wheel hub. The inner member is formed with double row inner raceway surfaces arranged opposite to the double row outer raceway surfaces. Double row rolling elements are rollably contained between the double row outer raceway surfaces and double row inner raceway surfaces. A constant velocity universal joint is torque transmittably inserted into the wheel hub. It is axially separably connected to the wheel hub by a securing nut. A shoulder of an outer joint member of the constant velocity universal joint abuts against the inner member. An abutting surface of the inner member that abuts the shoulder of an outer joint member is formed so that it does not include a segment of mirror finished surface having an area exceeding 0.005 mm².

The vehicle wheel bearing apparatus comprises an outer member, an inner member with a wheel hub and an inner ring press fit onto the wheel hub. Double row rolling elements are rollably contained between the outer and inner members. A constant velocity universal joint is torque transmittably inserted into the wheel hub. It is axially separably connected to the wheel hub by a securing nut. A shoulder of an outer joint member of the constant velocity universal joint abuts against the inner member. An abutting surface of the inner member that abuts the shoulder of an outer joint member is formed so that it does not include a segment of mirror finished surface having an area exceeding 0.005 mm². Thus, it is possible to reduce the coefficient of friction and thus to realize a smooth slippage relative to the mating member abutting against one another. Accordingly, it is possible to provide a wheel bearing apparatus that prevents the generation of the stick-slip noise for a long term.

The abutting surface of the inner member is formed so that a total area of the mirror finished surface segments each have an area less than 0.001 mm² and occupy 90% or more of the whole area of the abutting surface of the inner member. This prevents the generation of difference of acceleration between the abutting surfaces of the inner member and the outer joint member and thus prevents the generation of the stick-slip noise.

The standard deviation of values of the brightness of the abutting surface is 2.3 or less.

The surface roughness of the abutting surface is set within a range of Ra 0.05-Ra 0.7 μm. This makes it possible to prevent catching of the abutting surfaces caused by irregularity of the surface of the inner member. Thus, this surely prevents the generation of the stick-slip noise.

The shoulder of the outer joint member abuts with a larger end face of the inner ring. The larger end face of the inner ring is end face-scratched after having been ground. This makes it possible to reduce the mirror finished surface segments formed by grinding the larger end face. Thus, this simultaneously increases linear scratched traces. Accordingly, it is possible to reduce the coefficient of friction and thus to smoothly slip the abutting surfaces from each other.

The inner ring is axially secured by a caulked portion. The caulked portion is formed by plastically deforming the end of the cylindrical portion radially outward. The shoulder of the outer joint member abuts against the caulked portion. The end face of the caulked portion is flattened by turning after the plastic deformation. Thus, the flattened surface is formed with spirally turned traces. This makes it possible to prevent catching of the abutting surfaces caused by irregularity of the surface of the inner member. Thus, this surely prevents the generation of the stick-slip noise.

The flattened surface is end face-scratched after turning. This makes it possible to reduce the mirror finished surface segment portions formed by grinding the larger end face. Thus, this simultaneously increases linear scratched traces. Accordingly, it is possible to reduce the coefficient of friction and to smoothly slip the abutting surfaces from each other.

The shoulder of the outer joint member is ground or lathe turned. Thus, the surface abutting against the inner member is formed with concentric lathe turned traces. This makes it possible to prevent catching of the abutting surfaces caused by irregularity of the surface of the inner member. Thus, this surely prevents a generation of the stick-slip noise.

A serration is formed on the outer circumference of a shaft portion of the outer joint member. The serration has a helix angle inclined at a predetermined angle relative to the axis of the shaft portion. This makes it possible to prevent the generation of sudden slippage between abutting surfaces of the inner member and the outer joint member. Thus, this further prevents the generation of the stick-slip noise even though a large torsional force is caused in a drive shaft.

The vehicle wheel bearing apparatus of the present disclosure comprises an outer member integrally formed with double row outer raceway surface on its inner circumference. An inner member includes a wheel hub integrally formed with a wheel mounting flange on one end. Its other end includes an axially extending cylindrical portion. At least one inner ring is press fit onto the cylindrical portion of the wheel hub. The inner member is formed with double row inner raceway surfaces arranged opposite to the double row outer raceway surfaces. Double row rolling elements are rollably contained between the double row outer raceway surfaces and double row inner raceway surfaces. A constant velocity universal joint is torque transmittably inserted into the wheel hub. It is axially separably connected to the wheel hub by a securing nut. A shoulder of an outer joint member of the constant velocity universal joint abuts against the inner member. An abutting surface of the inner member that abuts the shoulder of an outer joint member is formed so that it does not include a segment of mirror finished surface having an area exceeding 0.005 mm². Thus, it is possible to reduce the coefficient of friction and realize a smooth slippage relative to the mating members abutting against one another. Accordingly, it is possible to provide a wheel bearing apparatus that prevents the generation of the stick-slip noise for a long term.

A vehicle wheel bearing apparatus comprises an outer member integrally formed with double row outer raceway surfaces on its inner circumference. An inner member includes a wheel hub integrally formed with a wheel mounting flange on one end. Its other end includes an axially extending cylindrical portion. At least one inner ring is press fit onto the cylindrical portion of the wheel hub. The inner member is formed with double row inner raceway surfaces arranged opposite to the double row outer raceway surfaces. Double row rolling elements are rollably contained between the double row outer raceway surfaces and double row inner raceway surfaces. A constant velocity universal joint is torque transmittably inserted into the wheel hub. It is axially separably connected to the wheel hub by a securing nut. A shoulder of an outer joint member of the constant velocity universal joint abuts against the inner member. The shoulder of the outer joint member and the larger end face of the inner ring are ground. The larger end face of the inner ring is end face-scratched after grinding. Also, it is formed so that it does not include a segment of a mirror finished surface having an area exceeding 0.005 mm².

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of a first embodiment of a vehicle wheel bearing apparatus.

FIG. 2 is a graph of a relationship between the coefficient of friction and an area of mirror finished segments of a larger end face of an inner ring.

FIG. 3 is a graph of a relationship between the coefficient of friction and the surface roughness.

FIG. 6 is a schematic view of a surface of the shoulder of the outer joint member.

FIG. 7 is a longitudinal section view of a second embodiment of the vehicle wheel bearing apparatus.

FIG. 8 is a longitudinal section view of a prior art vehicle wheel bearing.

FIG. 9(a) is a partial perspective view of a smaller end face of an inner ring of FIG. 8.

FIG. 9(b) is a partial perspective view of a larger end face of the inner ring of FIG. 8.

DETAILED DESCRIPTION

A preferred embodiments of the present disclosure will be hereinafter described with reference to the drawings.

Figure 4A:
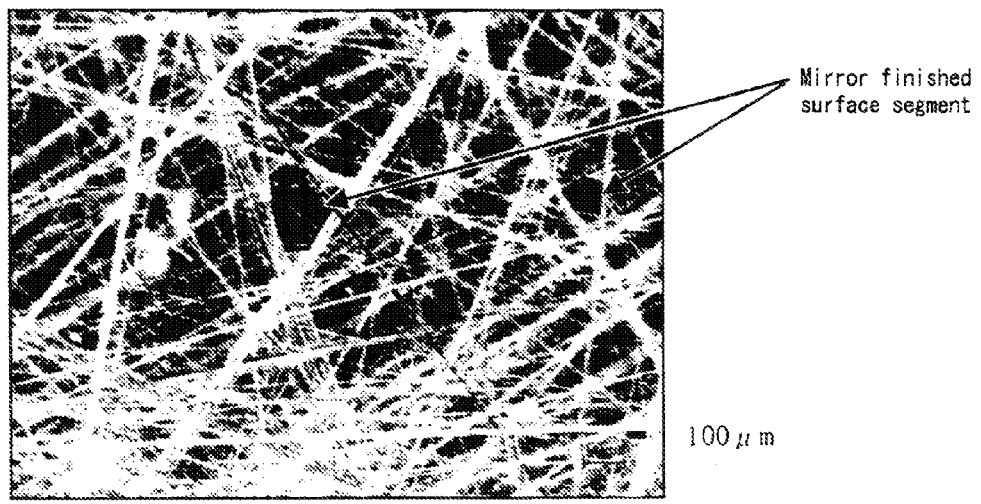
FIG. 4(a) is a microphotograph showing surfaces of end faces of inner rings that generate the stick-slip noise.
Figure 4B:
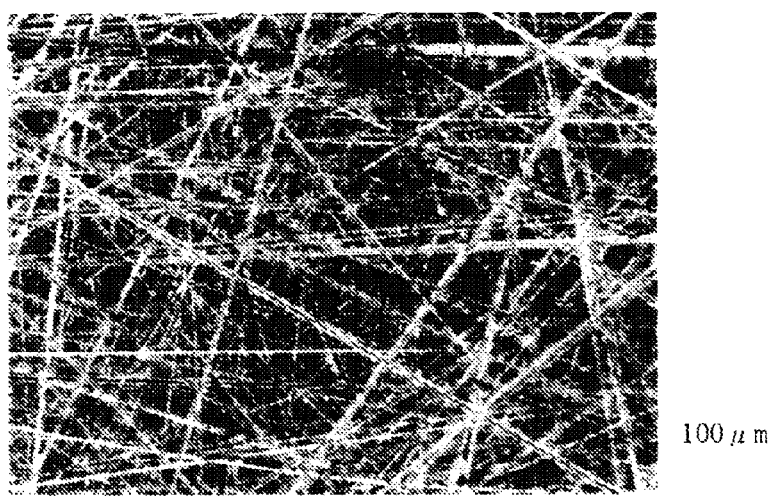
FIG. 4(b) is a microphotograph showing surfaces of end faces of inner rings that do not generate the stick-slip noise.
Figure 5A:
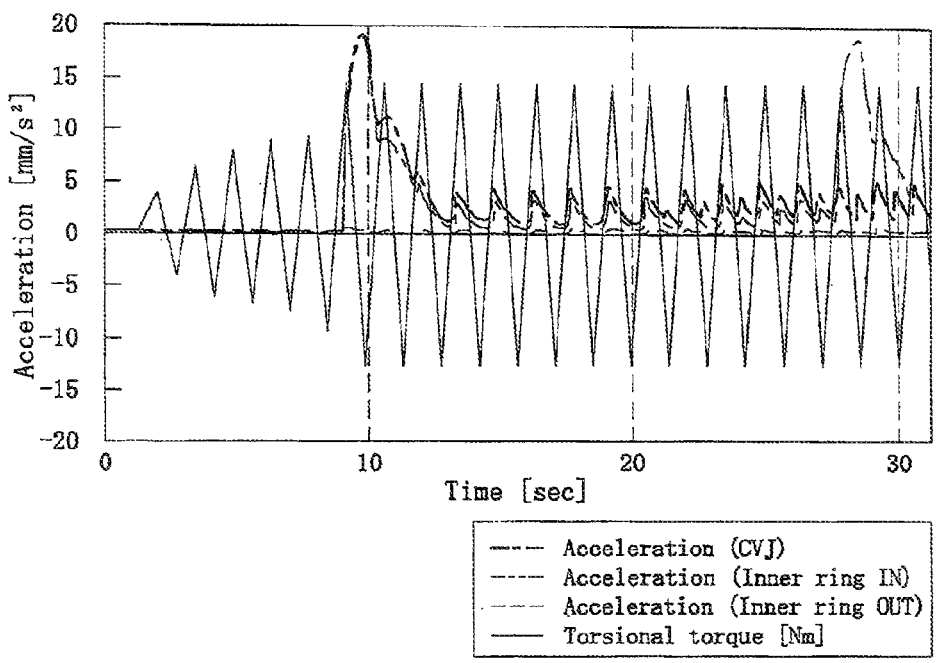
FIG. 5(a) is a graph showing results of a measurement of the stick-slip noise with concerns to a sample having a mirror finished surface on a larger end face of an inner ring.
Figure 5B:
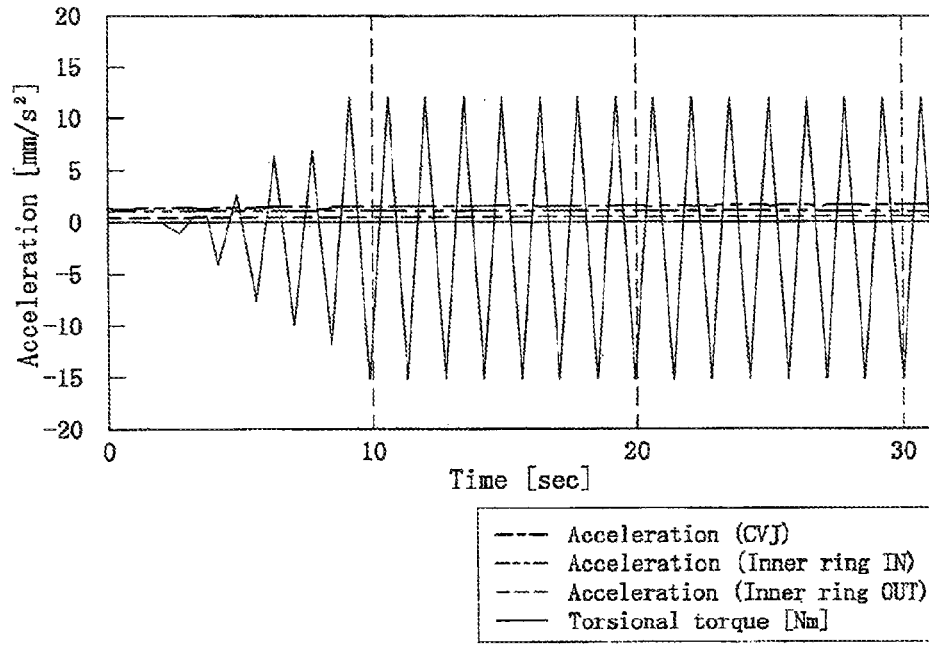
FIG. 5(b) is a graph showing results of a measurement of the stick-slip noise with concerns to a sample not having a mirror finished surface.

FIG. 1 is a longitudinal section view of a first embodiment of the vehicle wheel bearing apparatus. FIG. 2 is a graph showing a relationship between the coefficient of friction and an area of mirror finished surface segments of a larger end face of an inner ring. FIG. 3 is a graph showing a relationship between the coefficient of friction and the surface roughness. FIG. 4(a) is a microphotograph showing a surface generating a stick-slip noise. FIG. 4(b) is a microphotograph showing a surface not-generating the stick-slip noise. FIG. 5(a) is a graph showing results of a measurement of the stick-slip noise concerning a sample having a mirror finished surface on a larger end face of an inner ring. FIG. 5(b) is a graph like FIG. 5(a) concerning a sample not having a mirror finished surface. FIG. 6 is a schematic view showing a surface of the shoulder of the outer joint member. In the description below, the term "outer side" of the apparatus denotes a side that is positioned outside of the vehicle body (the left hand side of FIG. 1). The term "inner side" of the apparatus denotes a side that is positioned inside of the body (the right hand side of FIG. 1) when the bearing apparatus is mounted on the vehicle body.

The vehicle wheel bearing apparatus of the present disclosure includes a wheel hub 1 with a wheel W and a brake rotor B mounted at its one end. A wheel bearing 2 rotationally supports the wheel hub 1. A secured type constant velocity universal joint 3 transmits power from a drive shaft (not shown).

The wheel hub 1 has an integrally formed wheel mounting flange 4 at the outer side end. The wheel W and the brake rotor B are mounted to the flange 4. A cylindrical portion 1b axially extends from the wheel mounting flange 4. The wheel hub 1 is formed with serrations (or splines) on its inner circumference. The serrations (or splines) 1c provide torque transmission. Hub bolts 4a are equidistantly arranged along the flange outer circumference to fasten the wheel W and the brake rotor B.

The wheel bearing 2 has an outer member (outer ring) 5 formed with double row outer raceway surfaces 5a, 5a on its inner circumference. A pair of inner rings 16, 6 is formed with inner raceway surfaces 6a, 6a on their inner circumferences.

The inner raceway surfaces 6a, 6a are arranged opposite to the double row outer raceway surfaces 5a, 5a. Double row rolling elements (balls) 8, 8 are rollably contained between the outer and inner raceway surfaces 5a, 5a and 6a, 6a, via cages 7. The wheel bearing 2 is mounted between a knuckle N, forming part of a suspension apparatus, and the cylindrical portion 1b of the wheel hub 1. The wheel bearing 2 is a double row angular contact ball bearing of a so-called "back-to-back duplex type". A larger end face of the outer side inner ring 16 abuts against the shoulder 1a of the wheel hub 1. The smaller end faces of the pair of inner rings 16, 6 abut against each other. Seals 14, 15 are mounted in annular openings formed between both ends of the outer member 5 and the inner rings 16, 6. The seals 14, 15 prevent leakage of lubricating grease contained within the bearing as well as the entry of rain water or dust from the outside.

The constant velocity universal joint 3 includes an outer joint member 11 with a shoulder 9 formed at a bottom of a cup shaped mouth portion (not shown). A shaft portion 10 axially extends from the shoulder 9. The shaft portion 10 is formed with serrations 10a (or splines) on its outer circumference. The serrations (or splines) 10a engage the serrations 1c of the wheel hub 1. The serrations 10a have a helix angle inclined at a predetermined angle relative to an axis of the shaft portion. The shaft portion 10 is inserted into the wheel hub 1 until the shoulder 9 of the outer joint member 11 abuts against the inner side inner ring 6. Thus, the shaft portion 10 is press-fit into the serrations 1c of the wheel hub 1. A securing nut 13 is fastened onto an outer thread 12, formed on the end of the shaft portion 10 of the outer joint member 11. The nut 13 is secured at a predetermined fastening torque to connect the outer joint member 11 to the wheel hub 1 under a condition where a predetermined pre-pressure is applied to the bearing 2. Thus, the pre-pressure is applied to the fitting portion between the serrations 1c, 10a. Accordingly, play in a circumferential direction between the serrations is eliminated. Thus, it is possible to prevent the generation of sudden slippage between abutting surfaces of the outer joint member and the inner ring. Further, this eliminates the generation of stick-slip noise even when a large torsion force is created in the drive shaft. Also, this improves the rigidity and the durability of the wheel bearing.

The wheel hub 1 is made of medium high carbon steel such as S53C including carbon of 0.40-0.80% by weight. It is hardened by high frequency induction hardening in a region from the shoulder 1a to the cylindrical portion 1b to have a surface hardness of 58-64 HRC. The high frequency hardening increases the mechanical strength relative to the rotary bending load applied to the wheel mounting flange 4. This improves the anti-fretting property of the cylindrical portion 1b of the wheel hub 1 onto which the inner ring 6 is fit.

The outer member 5, inner rings 16, 6 and rolling elements 8 are made from high carbon chrome steel such as SUJ2. They are hardened to their core portions by dip quenching to have a surface hardness of 58-64 HRC. In addition, the outer joint member 11 is made of medium high carbon steel such as S53C including carbon of 0.40-0.80% by weight. It is hardened by high frequency induction hardening in a region from the shoulder 9 to the shaft portion 10 to have a surface hardness of 58-64 HRC.

Although it is illustrated and described with a double row angular contact ball bearing using balls as rolling elements, it is possible to apply the present disclosure to a double row tapered roller bearing using tapered rollers as the rolling elements. In addition, although the illustrated wheel bearing apparatus is a first generation type, it is possible to apply the present disclosure to all the first through third generation types where an outer joint member of a constant velocity universal joint is connected to a wheel bearing apparatus and a pre-pressure is applied to the bearing by fastening a securing nut to the outer joint member.

According to the present disclosure the shoulder 9 of the outer joint member 11 and the larger end face 6b of the inner ring 6 are ground. It is appreciated that the stick-slip noise will be caused by a cause of discontinuous slippage between the shoulder 9 of the outer joint member 11 and the larger end face 6b of the inner side inner ring 6. Thus, it is possible to suppress the generation of the stick-slip noise by causing a smooth slippage between the abutting surfaces. For example, according to a microphotograph of the ground larger end face 6b of the inner side inner ring 6, it can be seen that it is formed with a large number of linear scratched traces extending in irregular directions and smooth mirror finished surface segments.

The applicant has noticed a condition of the finished surface of the larger end face 6b, especially of the inner side inner ring 6, causes a smooth slippage in the abutting surfaces when a large torsion is caused between the outer joint member 11 and the inner ring 6. It has found that there is a correlation between the mirror finished surface segments in the larger end face 6b and the generation of the stick-slip noise. That is, the ground surface of the larger end face 6b of the inner side inner ring 6 includes a large area of mirror finished surface segments and the mirror finished surface segments are further increased in accordance with improvement of the surface roughness. As a result of a torsion bench test carried out by the applicant, it has found that the mirror finished surface segments of the larger end face 6b of the inner ring 6 tend to be adhered to the ground mating surface of the shoulder 9 of the outer joint member 11. Thus, the stick-slip noise is generated when the abutting surfaces between them are released from each other. A very large stick-slip noise is generated when the mirror finished surface segments are further increased.

FIG. 2 is a graph showing a relationship between the coefficient of friction and an area of mirror finished segments of a larger end face 6b of the inner ring 6. As can be seen from FIG. 2, the coefficient of friction will be suddenly increased when the area of the mirror finished surface segments is increased in the larger end face 6b of the inner ring 6 including linear scratched traces and smooth mirror finished surface segments. According to the present disclosure, the larger end face 6b of the inner side inner ring 6 is end face-scratched after its grinding. Accordingly, the area of the mirror finished surface segments of the larger end face 6b is reduced by the end face scratching and the linear scratched traces are increased. Thus, it is possible to effectively prevent the generation of the stick-slip noise due to the reduction of the coefficient of friction and smooth slippage of the abutting surfaces of the larger end face 6b of the inner ring 6 and the shoulder 9 of the outer joint member 11.

Although it is described that the end face scratching is performed after grinding, it may be possible that it is performed after heat treatment of the inner ring 6. Furthermore, the end face scratching may be replaced by shot peening, performed after grinding. As shown in FIG. 3, the surface roughness of the larger end face 6b is preferably within a range of Ra 0.05-Ra 0.7 μm. This is because the area of mirror finished surface is increased when the surface roughness exceeds Ra 0.05 μm. On the contrary, the stick-slip noise is generated due to catching caused by irregularities of a surface when the surface roughness is below Ra 0.7 μm. Herein the surface roughness "Ra" is one of roughness configuration parameters of JIS (JIS B0601-1994) and means an average value of the absolute value deviation from the average line.

As described above according to the present disclosure, at least the larger end face 6b of the inner side inner ring 6 is end face-scratched when the shoulder 9 of the outer joint member 11 is ground. Thus, the mirror finished surface segments are reduced and fine linear scratched traces are increased. Accordingly, adhesion of the abutting surfaces between the shoulder 9 and the larger end face 6b of the inner ring 6 is prevented. Thus, smooth slippage between the abutting surfaces can be achieved and the generation of the stick-slip noise can be prevented. When the shoulder 9 of the outer joint member 11 is ground, it is preferable to simultaneously grind the abutting surface against which the larger end face 6b of the inner side inner ring 6 abuts and the outer circumferential surface. This is because concentric ground traces are formed on the larger end face 6b of the inner side inner ring 6 as shown in FIG. 6. Thus, catching caused by irregularities on the surface and accordingly the generation of the stick-slip noise can be prevented.

Furthermore, the applicant has noticed that the area of the mirror finished surface segments has a correlation with the generation of the stick-slip noise even in a condition of the finished surface of the larger end face 6b of the inner side inner ring 6.

FIG. 4 displays microphotographs showing surfaces of end faces of inner rings. FIG. 4(a) shows a surface generating the stick-slip noise. FIG. 4(b) shows a surface that does not generate the stick-slip noise. If there is a mirror finished surface segment having an area of 0.005 mm$^2$ or more on the larger end face 6b of the inner ring 6, as shown in FIG. 4(a), it is found that a difference in acceleration of the inner ring 6 and that of the outer joint member 11 is noticed. Thus, the stick-slip noise is generated (FIG. 5(a)). On the contrary, if a total area of mirror finished surface segments each has an area less than 0.001 mm$^2$ occupying 90% or more of the whole area of the abutting surface of the larger end face 6b of the inner ring 6 as shown in FIG. 4(b), it is found that a difference in acceleration of the inner ring 6 and that of the outer joint member 11 is not noticed even though the same torsional torque is applied between the surfaces. Thus, the stick-slip noise is not generated (FIG. 5(b)).

In the surface condition of the larger end face 6b of the inner ring 6 shown in FIG. 4(a), the standard deviation of values of the brightness of the abutting surface is in a range of 2.31-2.53. On the contrary, it is in a range of 1.68-1.79 in a case shown in FIG. 4(b). Accordingly, it is found that no stick-slip noise is generated when the standard deviation of values of the brightness of the larger end face 6b of the inner ring 6 is 2.3 or less, preferably 1.8 or less.

FIG. 7 is a longitudinal section view of a second embodiment of the vehicle wheel bearing apparatus. This embodiment differs from the first embodiment only in the structure of the bearing portion. Accordingly, the same reference numerals are used in this embodiment to designate the same parts and their details will be omitted.

The vehicle wheel bearing apparatus of this embodiment includes an outer member 17 integrally formed with a body mounting flange 17b on its outer circumference. The body mounting flange 17b is mounted on a knuckle (not shown). The outer member inner circumference includes double row outer raceway surfaces 17a, 17a. An inner member 19 includes a wheel hub 18 and an inner ring 16. The wheel hub 18 is formed with one inner raceway surface 18a on its outer circumference. The one inner raceway surface 18a opposes one (outer side one) of the outer raceway surfaces 17a, 17a. A cylindrical portion 18b axially extends from the inner raceway surface 18a. The inner ring 16 is press-fit onto the cylindrical portion 18b of the wheel hub 18. The inner ring outer circumference is formed with the other inner raceway surface 6a. The inner raceway surface 6a opposes the other one (inner side one) of the double row outer raceway surfaces 17a, 17a. Double row rolling elements 8, 8 are rollably contained between the outer and inner raceway surfaces 17a, 17a and 18a, 6a, via cages 7. A secured type constant velocity universal joint 3, transmitting power from a drive shaft (not shown) to the wheel hub 18, is adapted to be connected to the wheel hub 18.

Seals 20, 15 are mounted in annular openings formed between the outer member 17 and the inner member 19, The seals 20, 15 prevent leakage of lubricating grease contained within the bearing as well as the entry of rain water or dust from the outside. The inner ring 16 is axially immovably secured on the cylindrical portion 18b of the wheel hub 18 by a caulked portion 22. The caulked portion 22 is formed by plastically deforming the end of the cylindrical portion 18b radially outward under a predetermined bearing pre-pressured condition.

The wheel hub 18 is made of medium/high carbon steel including carbon of 0.40-0.80% by weight such as S53C. The wheel hub 18 is hardened by high frequency induction quenching so that a region from an inner side base 21 of the wheel mounting flange 4, forming a seal-land portion for the outer side seal 20, to the cylindrical portion 18b is hardened to have a surface hardness of 58-64 HRC. The caulked portion 22 is not quenched and remained as is with its surface hardness after forging.

The outer member 17 is made of medium/high carbon steel such as S53C including carbon of 0.40-0.80% by weight. The double row outer raceway surfaces 17a, 17a are hardened by high frequency induction hardening to have a surface hardness of 58-64 HRC.

In this embodiment the end face of the caulked portion 22 is formed with a flattened surface 22a by lathe turning after its plastic deforming process. The flattened surface 22a is formed with spiral lathe turned traces. Thus, catching caused by irregularities on the flattened surface and accordingly the generation of the stick-slip noise between the abutting surfaces of the shoulder 9 of the outer joint member 11 and the flattened surface 22a can be prevented.

The flattened surface 22a of the caulked portion 22, after lathe turning, may be end face scratched (or shot peened). Similar to the previously described embodiment, it is preferable to set the surface roughness of the flattened surface 22a within a range of Ra 0.05-Ra 0.7 μm and more preferable within a range of Ra 0.1-Ra 0.3 μm. The end face scratching reduces the area of mirror finished surfaces and increases the fine linear scratched traces. Thus, it is possible to reduce the coefficient of friction and to cause smooth slippage between the abutting surfaces as well as to prevent the generation of the stick-slip noise.

The present disclosure can be applied to a vehicle wheel bearing apparatus with a wheel hub, an inner ring or rings press fit on the wheel hub. An outer joint member is inserted into the wheel hub and abuts against the inner ring or the caulked portion. The wheel hub and the outer joint member are secured by a fastening force of a securing nut fastened to the outer joint member.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
   an outer member integrally formed with double row outer raceway surfaces on its inner circumference;
   an inner member including a wheel hub and at least one inner ring, the wheel hub is integrally formed with a wheel mounting flange on one end and an axially extending cylindrical portion on its other end, the at least one inner ring is press fitted onto the cylindrical portion of the wheel hub, the inner member is formed with double row inner raceway surfaces arranged opposite to the double row outer raceway surfaces;
   double row rolling elements are rollably contained between the double row outer raceway surfaces and double row inner raceway surfaces;
   a constant velocity universal joint is torque transmittably inserted into the wheel hub and axially separably connected to the wheel hub by a securing nut, a shoulder of an outer joint member of the constant velocity universal joint abuts against the inner member;
   an abutting surface of the inner member abuts the shoulder of the outer joint member, the inner member abutting surface having a plurality of mirror finished surface segments, an area of each mirror finished surface segment does not exceed 0.005 mm$^2$.

2. The vehicle wheel bearing apparatus of claim 1, wherein the abutting surface of the inner member is formed so that the mirror finished surface segments each have an area less than 0.001 mm$^2$, and wherein a total area of the mirror finished surface segments occupy 90% or more of an entire area of the abutting surface of the inner member.

3. The vehicle wheel bearing apparatus of claim 1, wherein the standard deviation of values of a brightness of the abutting surface is 2.3 or less.

4. The vehicle wheel bearing apparatus of claim 1, wherein surface roughness of the abutting surface is set within a range of Ra 0.05-Ra 0.7 μm.

5. The vehicle wheel bearing apparatus of claim 1, wherein the shoulder of the outer joint member abuts with a larger end face of the inner ring, and the larger end face of the inner ring is end face-scratched after being ground.

6. The vehicle wheel bearing apparatus claim 1, wherein the at least one inner ring is axially secured by a caulked portion formed by plastically deforming an end of the cylindrical portion radially outward, the shoulder of the outer joint member abuts against the caulked portion, and an end face of the caulked portion is flattened by turning after the plastic deformation so that the end face is formed with spirally turned traces.

7. The vehicle wheel bearing apparatus of claim 6, wherein the end face of the caulked portion is end face-scratched after the turning.

8. The vehicle wheel bearing apparatus of claim 1, wherein the shoulder of the outer joint member is ground or lathe turned so that the surface abutting the inner member is formed with concentric traces.

9. The vehicle wheel bearing apparatus of claim 1, wherein serrations are formed on an outer circumference of a shaft portion of the outer joint member, and the serrations have a helix angle inclined at a predetermined angle relative to the axis of the shaft portion.

* * * * *